United States Patent [19]
Spix et al.

[11] Patent Number: 5,202,988
[45] Date of Patent: Apr. 13, 1993

[54] SYSTEM FOR COMMUNICATING AMONG PROCESSORS HAVING DIFFERENT SPEEDS

[75] Inventors: George A. Spix; Gregory G. Gaertner; Diane M. Wengelski; Keith J. Thompson, all of Eau Claire, Wis.

[73] Assignee: Supercomputer Systems Limited Partnership, Eau Claire, Wis.

[21] Appl. No.: 571,951

[22] Filed: Aug. 23, 1990

Related U.S. Application Data

[63] Continuation-in-part of Ser. No. 537,466, Jun. 11, 1990.

[51] Int. Cl.$^5$ .................................................. G06F 15/16
[52] U.S. Cl. .................... 395/650; 364/DIG. 1; 364/228.1; 364/228.9; 364/281.3; 364/281.7; 364/281.8
[58] Field of Search ... 364/200 MS File, 900 MS File; 395/650, 725

[56] References Cited

U.S. PATENT DOCUMENTS

| | | | |
|---|---|---|---|
| 4,177,513 | 12/1979 | Hoffman et al. | 395/650 |
| 4,615,001 | 9/1986 | Hudgins, Jr. | 364/200 |
| 4,644,461 | 2/1987 | Jennings | 364/200 |
| 4,646,231 | 2/1987 | Green et al. | 364/200 |
| 4,805,107 | 2/1989 | Kieckhafer et al. | 364/200 |
| 4,943,913 | 7/1990 | Clark | 364/200 |
| 5,031,089 | 7/1991 | Liu et al. | 364/200 |

Primary Examiner—Michael R. Fleming
Assistant Examiner—Debra A. Chen
Attorney, Agent, or Firm—Earl C. Hancock

[57] ABSTRACT

Communication among processors having differing operating speeds by providing wake queues in which slower processors can queue entries, access to which by multiple concurrent producers and multiple concurrent consumers is synchronized or controlled using global registers. When a faster processor executes a kernel process for handling a wake queue, an entry is fetched from the wake queue and information stored in the entry is used to process the entry.

6 Claims, 5 Drawing Sheets

| INTERRUPT NUMBER | INTERRUPT HANDLER |
| --- | --- |
| 0 | CLOCKINTR |
| 1 | DISKINTR |
| 2 | TTYINTR |
| 3 | DEVINTR |
| 4 | SOFTINTR |
| 5 | OTHERINTR |

| -- | FULL | -- | WAIT |
|---|---|---|---|

| AVAIL | Q_MASK | Q_FWA |
|---|---|---|

| REGS | IDLE | ---- | NO_SIG |
|---|---|---|---|

| ---- | IN_ORD | ---- | OUT_ORD | SIZE | ---- | L |
|---|---|---|---|---|---|---|

FORMATS OF THE GLOBAL REGISTERS ASSOCIATED WITH THE WAKE QUEUE:

```
struct G_Stats {
    unsigned    pad1     : 4;
    unsigned    ful1     : 28;   /* occurrences of queue full*/
    unsigned    pad2     : 4;
    unsigned    wait     : 28;   /* occurrences of waiting
                                    on entry  */       };

struct G_Avail {
    unsigned    avail    : 16;   /* avail entries in queue */
    unsigned    q_mask   : 16;   /* static mask to do mod
                                    on ordinal */
    unsigned    q_fwa    : 32;   /* base addr of cluster's
                                    q entries */       };

struct G_Regs {
    unsigned    reqs     : 16;   /* #outstanding requests */
    unsigned    idle     : 8;    /* #idle processors */
    unsigned    pad      : 8;
    unsigned    no_sig   : 32;   /* bit map of cpus NOT to
                                    signal */          };

struct G_Offs {
    unsigned    pad1     : 8;    /* ensure no f&a overflow
                                    on in_ord  */
    unsigned    in_ord   : 16;   /* producer increments to
                                    get slot  */
    unsigned    pad2     : 8;    /* ensure no f&a overflow
                                    on out_ord  */
    unsigned    out_ord  : 16;   /*consumer increments
                                    to get slot  */
    unsigned    size     : 8;    /*entry size in bytes*/
                                 /* addr = [in] [out]_ord
                                    *size+q_fwa  */
    unsigned    pad3     : 7;
    unsigned    lock     : 1;    /* table lock */       };
```

Note that the syntax "name : n" means that field "name" consists of "n" bits.

FIGURE 5

SYSTEM FOR COMMUNICATING AMONG PROCESSORS HAVING DIFFERENT SPEEDS

RELATED APPLICATIONS

This application is a continuation-in-part of an application filed in the U.S. Patent and Trademark Office on Jun. 11, 1990, entitled INTEGRATED SOFTWARE ARCHITECTURE FOR A HIGHLY PARALLEL MULTIPROCESSOR SYSTEM, Ser. No. 07/537,466, and assigned to the assignee of the present invention, the disclosure of which is hereby incorporated by reference in the present application. This application is also related to the copending application entitled GLOBAL REGISTERS FOR A MULTIPROCESSOR SYSTEM, Ser. No. 07/536,198. The application is also related to the copending applications filed currently herewith, entitled SCHEDULING METHOD FOR A MULTIPROCESSING OPERATING SYSTEM, and METHOD OF IMPLEMENTING KERNEL FUNCTIONS USING MINIMAL-CONTEXT PROCESSES, all of which are assigned to the assignee of the present invention, the disclosures of which are hereby incorporated by reference in the present application.

TECHNICAL FIELD

The present invention relates generally to multiprocessor computer systems and specifically to allocating processors in a tightly-coupled configuration to execute the threads of one or more multithreaded programs that are running on the system simultaneously.

BACKGROUND ART

The present invention involves the way the wake queue in the preferred embodiment of the computer system operates for coprocessors of unequal speed versus how an interrupt handler operates. The wake queue consists of a data structure used as a repository between communicating processors and the locking scheme implemented in the global registers which coordinates access to that data structure. Instead of interrupts, the computer system can use the wake queue to alert the consumer (procesor) of a request from a producer (i.e., disk drive). Prior art has typically involved interrupt handlers in computer systems such as is done in conjunction with the UNIX TM [1] operating system.
1. UNIX is a trademark of AT&T Bell Laboratories.

In the prior art, the kernel is responsible for handling interrupts, whether they result from hardware (such as from the clock or from peripheral devices), from a programmed interrupt (execution of instructions designed to cause "software interrupts"), or from exceptions (such as page faults). If the CPU is executing at a lower processor execution level than the level of the interrupt, it accepts the interrupt before decoding the next instruction and raises the processor execution level, so that no other interrupts of the same or lower level can be serviced while it handles the current interrupt, preserving the integrity of kernel data structures. The kernel handles the interrupt with the following sequence of operations:

1. It saves the current register context of the executing process and creates (pushes) a new context layer.

Figure 1:
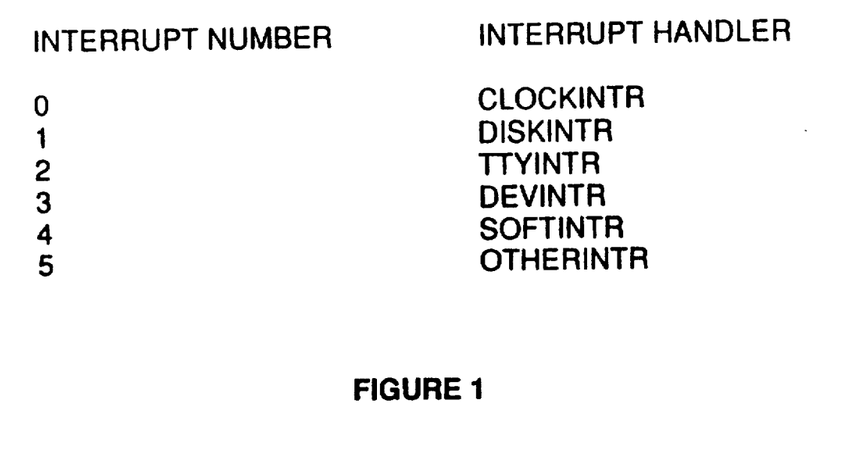
FIG. 1 is a table showing prior art interrupt handlers.

2. It determines the "source" or cause of the interrupt, identifying the type of interrupt (such as clock or disk) and the unit number of the interrupt, if applicable (such as which disk drive caused the interrupt). When the system receives an interrupt, it gets a number from the machine that it uses as an offset into a table, commonly called an interrupt vector. The contents of interrupt vectors vary from machine to machine, but they usually contain the address of the interrupt handler for the corresponding interrupt source and a way of finding a parameter for the interrupt handler. For example, in the table of interrupt handlers in FIG. 1, when a terminal interrupts the system, the kernel gets interrupt number 2 from the hardware and invokes the terminal interrupt handler ttyintr.

3. The kernel invokes the interrupt handler. The kernel stack for the new context layer is logically distinct from the kernel stack of the previous context layer. Some implementations use the kernel stack of the executing process to store the interrupt handler stack frames, and other implementations use a global interrupt stack to store the frames for interrupt handlers that are guaranteed to return without switching context.

4. The interrupt handler completes its work and returns. The kernel executes a machine-specific sequence of instructions that restores the register context and kernel stack of the previous context layer as they existed at the time of the interrupt and then resumes execution of the restored context layer. The behavior of the process may be affected by the interrupt handler since the interrupt handler may have altered global kernel data structures and awakened sleeping processes. Usually, however, the process continues execution as if the interrupt had never happened. (Refer to "The Design of the UNIX Operating System" by Maurice J. Bach, pages 162-163, Prentice-Hall, 1986.)

SUMMARY OF THE INVENTION

In the present invention, items are placed on a queue, referred to as the wake queue. An objective of the invention is to provide a method of placing the items on the wake queue by a slower processor and removing them by a faster processor without having the faster processor wait for the slower processor. The wake queue invention also provides a method whereby processors of differing capability can efficiently communicate. This allows realization of the objective for the present invention of distributing the operating system efficiently. Slower coprocessors can queue entries in wake queues. Access to these wake queues are governed by a queuing mechanism which utilizes the global registers to synchronize multiple concurrent producers and multiple concurrent consumers. (Refer to the related patent GLOBAL REGISTERS FOR A MULTIPROCESSOR SYSTEM.)

When a fast processor runs the kernel procedure assigned to handle the wake queue, entries are pulled off of the wake queue and the information in that entry is processed. Implementations can vary widely depending upon the information and processing desired. One such implementation involves having the slower coprocessor queue a counting semaphore address onto a wake queue and having the kernel procedure then wake a process waiting for that semaphore. In this way, the objective of allowing coprocessors to schedule tasks to be done by the fast processors without delaying the fast processors is achieved.

Counting semaphores are software mechanisms for synchronization. The semaphore consists of a count of the available resources to be managed and a list associated with entities waiting for a resource. To implement a lock, this count is set to one so that only one resource, the lock, exists. If the semaphore is going to govern multiple resources, it is set to the number of resources available. This count is decremented as a resource is taken. When the semaphore count goes to zero, no more resources are available so the requester is put to sleep to wait for one to become available. As a process frees a resource, it increments the semaphore counter and wakes up a waiting process.

Another implementation has the slower coprocessor queuing command blocks onto the wake queue which a kernel procedure in a fast processor dequeues and queues onto a work queue before waking the appropriate kernel daemon to process that work queue. When this daemon runs, it consults the work queue to obtain and to process the information communicated from the slower processor. In this way, the objective of allowing fast processors to do post interrupt processing without being interrupted is achieved.

The objective of the present invention for the locking necessary to efficiently synchronize the different speed processors without blocking the faster processor is best described by the following analogy: To visualize this model, imagine a warehouse with a door for requestors and a door for workers. Inside the warehouse is a long table with chairs for requestors to write a work request on one side and opposite chairs for workers to pick up the work. The requestor looks at current requestor seats available before he enters the warehouse and, if zero, waits. Otherwise, he enters and decrements the requestor seat count.

To find a chair, he grabs the next request number (modulo number of chairs, initialized to zero), goes to the location, checks to see whether the previous requestor has left, sits down, and writes his work order. He then increments the current work order outstanding count by the worker door and may or may not ring the service to get help.

A worker, either on hearing the bell or on glancing at the work order outstanding count and seeing it nonzero, decrements the work order outstanding count and, if nonzero, enters the warehouse. To find a chair, he grabs the next service number (modulo number of chairs, initialized to zero), goes to the location, checks to see whether the previous worker has left, sits down, picks up the workorder, and leaves, incrementing the requestor seats available.

There is still individual locking required around the seat position. This circular queue is basically a lock distribution mechanism that avoids convoying around a master queue lock and is still FIFO in response. An individual requestor or worker can still be waiting each other if one or the other is slow (or not operating).

Although the present invention of the wake queue with the associated integrated dispatcher and the ability to create alternative processing entities is implemented in a tightly coupled, multithreaded, multiprocessing environment, it is not limited to this implementation. The wake queue method of the present invention can be implemented in other functions and utilities that require efficient processor scheduling.

Those having normal skill in the art will recognize the foregoing and other objects, features, advantages and applications of the present invention from the following more detailed description of the preferred embodiments as illustrated in the accompanying drawings.

DESCRIPTION OF THE PREFERRED EMBODIMENT

The wake queue mechanism is a way for coprocessors of unequal speed to efficiently communicate in a multiprocessor operating system. Slow speed producers can produce entries for high speed consumers without interrupting the consumer. The consumers in the present invention are typically processors in the preferred embodiment. Typical producers are anything attached to the input/output controller (IOC), i.e., a disk drive or a frame buffer, although the computer system processors can also be producers.

Figure 2:
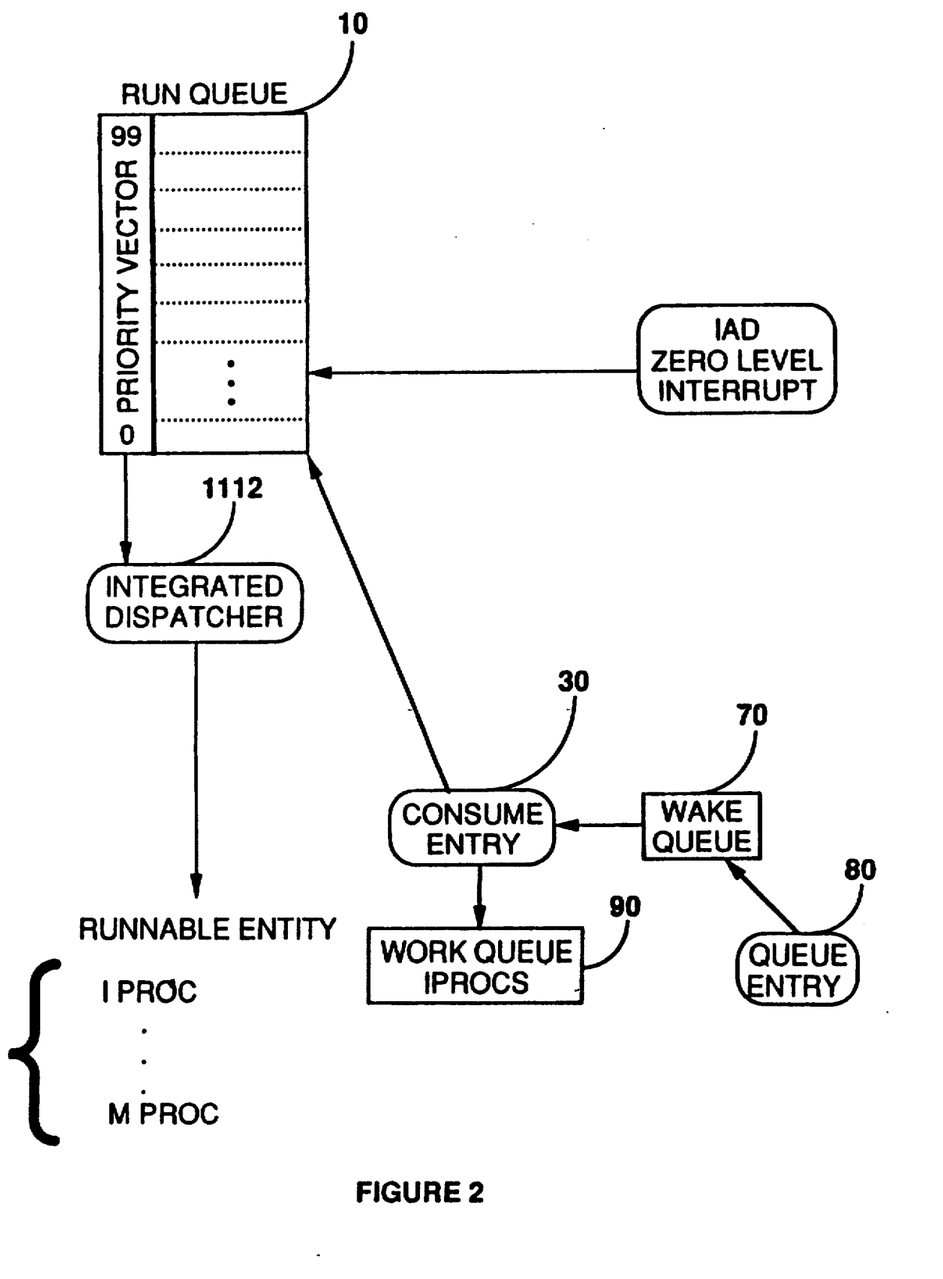
FIG. 2 is a schematic diagram showing the wake queue in the integrated dispatcher environment.

FIG. 2 shows the functions and data structures in the preferred embodiment of the wake queue. In the present invention, the producer communicates with the consumer by queuing an entry in the queue entry function 80 on a wake queue data structure 70. The entry is ultimately consumed by the consuming processor when it runs the integrated dispatcher function 1112, or any other kernel procedure assigned to process wake queue entries, which dequeues the entry via consume entry function 30. The related patent application entitled SCHEDULING MECHANISM FOR A MULTI-PROCESSING OPERATING SYSTEM contains information on the integrated dispatcher. Using the integrated dispatcher to process wake queue entries is useful in the preferred embodiment of the present invention; however, other means are available. That is, any kernel procedure can be enhanced with the intelligence needed to process wake queue entries.

The processing done on the entry can vary widely, depending upon the intelligence added in the consume entry function 30. For example, if the wake queue's entries consist of semaphore addresses, the consume entry function can wake a process waiting for the semaphore address in an entry, thereby queuing that process in the run queue data structure 10. This process is then eligible to be run. This allows coprocessors to schedule tasks they want fast processors to execute. If this wake queue's entries consist of command blocks, the consume entry function-30 could queue the command block onto a work queue data structure 90 and wake a waiting iproc, queuing it on the run queue data structure 10. An iproc is a minimal context process entity capable of performing all system-side tasks associated with kernel functions of a kernel based operating system. It is described in greater detail in the commonly assigned and copending patent application entitled METHOD OF IMPLEMENTING KERNEL FUNCTIONS USING MINIMAL-CONTEXT PROCESSES.

The iproc after being queued on the run queue 10, is eligible to run. When the iproc does, it consults the appropriate work queue to obtain the information communicated from the coprocessor and processes the information accordingly. This allows fast processors to do what is referred to in standard UNIX as "post interrupt processing" without having to interrupt the fast processor. It is important that once the iproc runs, it will process all of its work queue entries, not just one. That is, multiple entries may have been queued onto the wake queue by coprocessors and then transferred to the work queue before this iproc was chosen to run. This allows the consumer (the iproc) to process the output of multiple producers (the coprocessors) much more efficiently. It should be noted that what is placed on the wake queue and what the consumer does with it upon removal is irrelevant to the present invention. The invention is an apparatus for placing and removing items only.

The wake queue can be used to implement a coprocessor scheduling mechanism with limited interrupts. That is, interrupts are now limited to handle the case when the wake queue fills up. The wake queue is circular and of fixed size, so when it fills an interrupt is generated such that the integrated dispatcher can run and empty out the wake queue. This situation where the wake queue fills up could occur when the processors would otherwise be flooded by requests, as in the case of multiple striped disk requests occurring at the same time.

Figure 4:
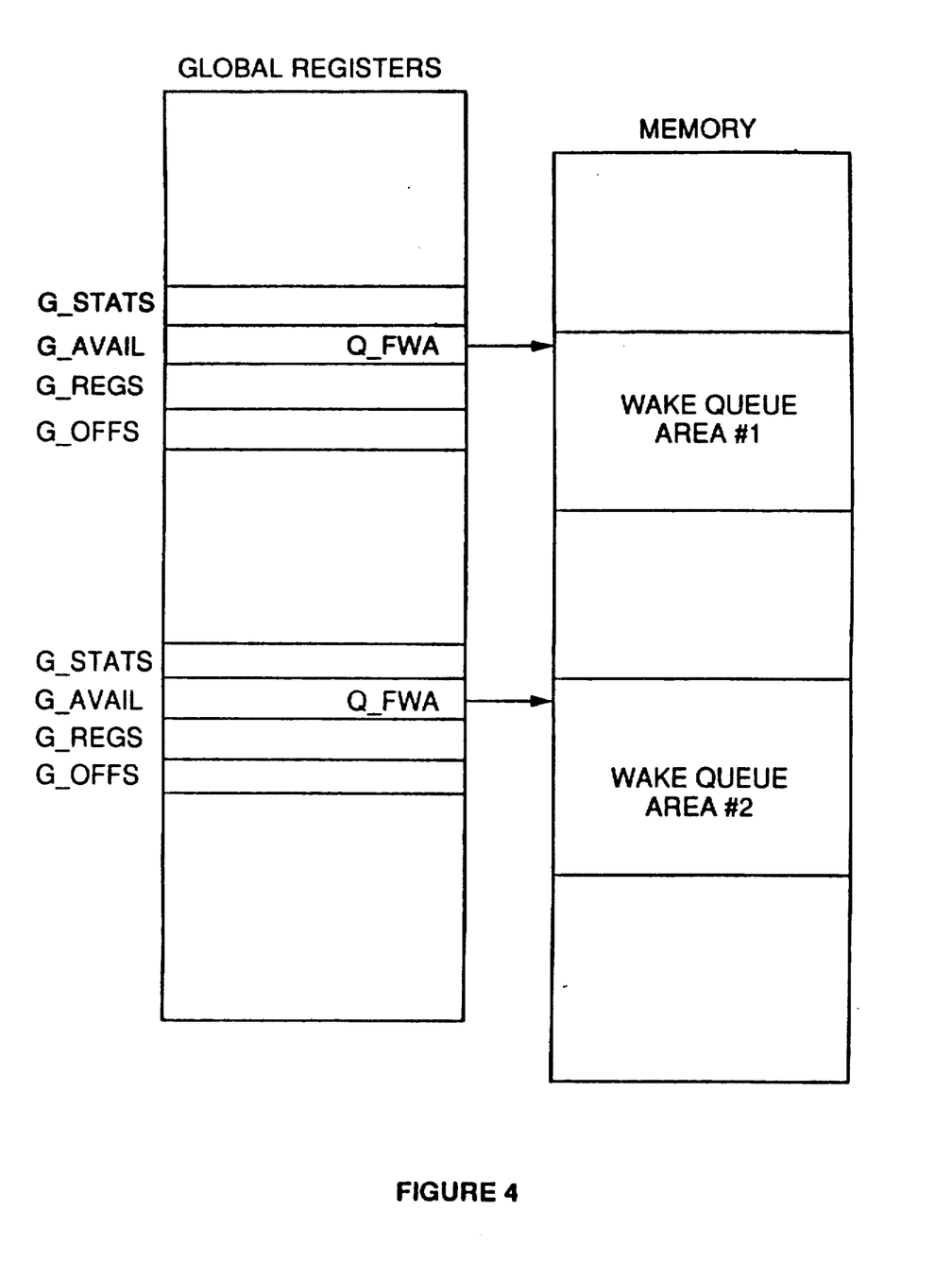
FIG. 4 is an illustration of the interaction between global registers and certain portions of memory.

The wake queue in accordance with this invention is to avoid having slower coprocessors (e.g. disk controller) interrupt fast processors, which slows down the fast processors. The wake queue eliminates such interruptions by letting coprocessors queue entries in a certain section of memory, called the wake queue. Access to this section of memory is governed by a locking mechanism implemented in a set of global registers. Interface functions between memory areas and global registers are illustrated in FIG. 4. Both the processors and the coprocessors must adhere to this locking mechanism when queuing or dequeuing entries in the wake queue.

Figure 3:
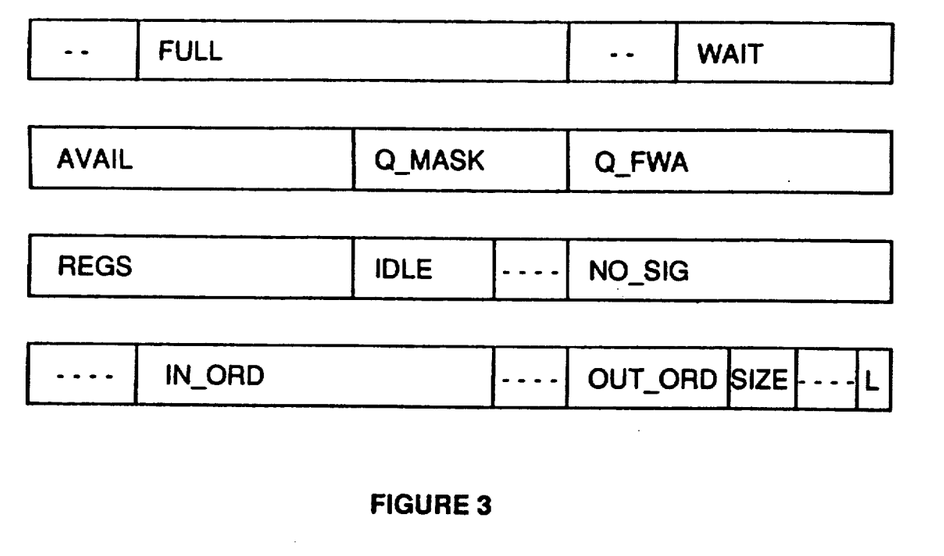
FIG. 3 is a pictorial representation of an excerpt showing the format of wake queue related global registers.
Figure 5:
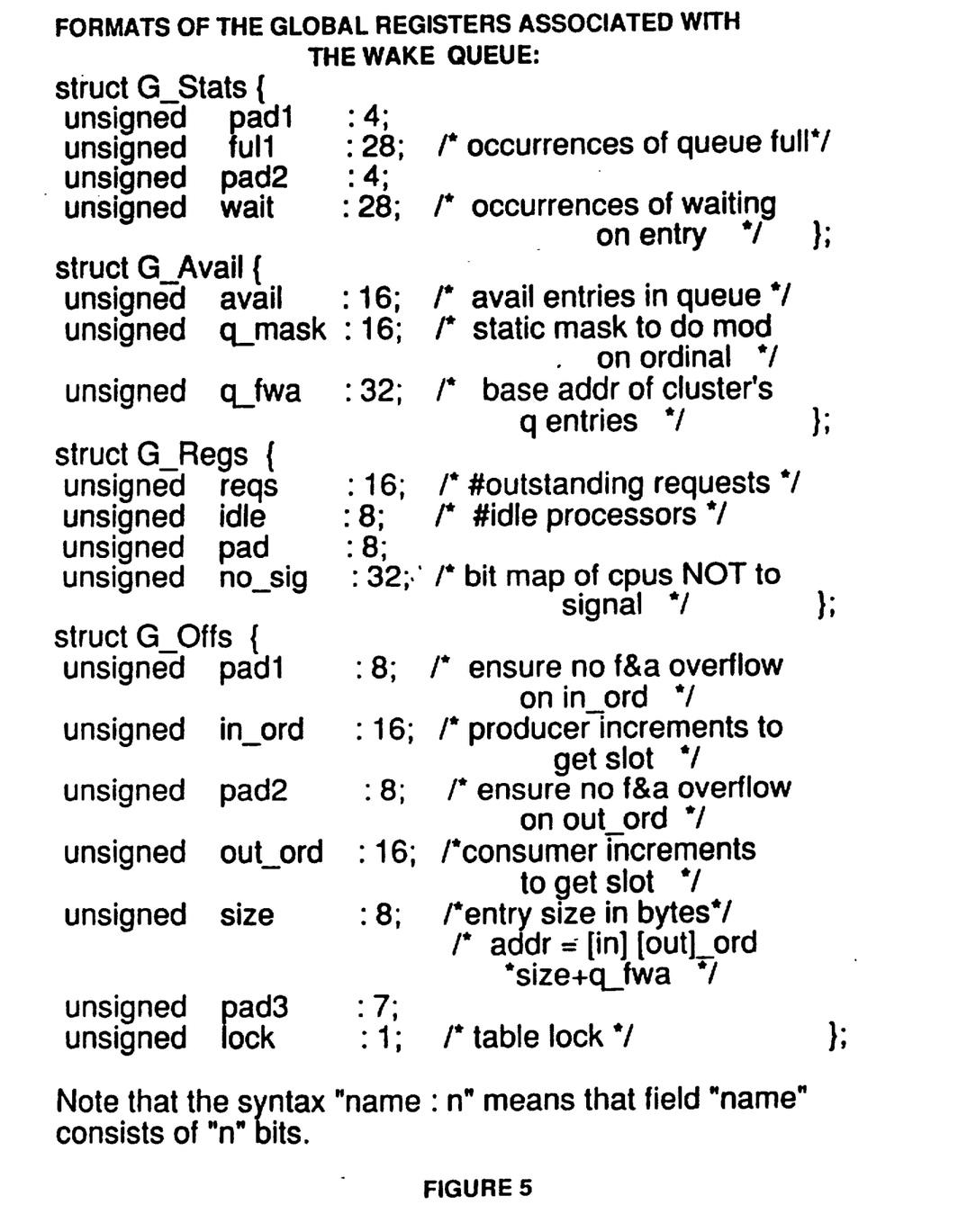
FIG. 5 is an excerpt from the header file that describes the format of the wake queue-related global registers.

FIG. 5 shows an excerpt from the header file that describes the format of the wake queue-related global registers with their format described pictorially in FIG. 3.

These Global registers are initialized as follows:

---

G.Stats = 0
full = 0, no occurrences of queue full
wait = 0, no occurrences of waiting for entry
G.Avail = 0
available = number of entries in queue (a power of 2)
queue_mask = available-1 (mod max entries)
queue_fwa = base address of queue entries (in this cluster)
G.Reqs = 0
requests = 0, number of requests outstanding
idle = number of idle processors
dont_signal = bit map of processors never to signal
(must always be at least one eligible)
G.Offs = 0
pad = 0, used to insure no f & a overflow of in and out ordinals
in_ordinal = 0, producer increments to get slot to store entry
out_ordinal = 0, consumer increments to get slot to process
size = entry size in words (address = ordinal*size + queue_fwa)
locked = 0, table unlocked

---

The locking mechanism implemented in these global registers is used to govern access to the memory being used as a wake queue. This mechanism consists of having 'producers' gain access to queue an entry on the wake queue by decrementing the "available" field and incrementing the "requests" field, and conversely, having 'consumers' gain access to dequeue an entry from the wake queue by decrementing the "requests" field and incrementing the "available" field. In this way, the in and out pointers safely chase each other through the queue entries.

That is, to queue an entry, a producer calls queue_entry which performs the following:

1. Uses an atomic operation to obtain and to update the G_Avail register value. If the avail field of this register indicates that there are no available slots in the wake queue, generate an interrupt to allow the fast processors to clean out the wake queue.

This operation can be a FCA (Fetch and Conditionally Add) instruction. FCA adds a value to the contents of the register and returns the result to that register if the result is greater than or equal to zero.

2. Uses an atomic operation to obtain and update the G_Offs register value.

This operation can be FAA (Fetch and Add) instruction. FAA adds a value to the contents of the register and returns the result to that register.

3. Calculates the address in the wake queue at which to deposit the entry using the in_ord and size fields of the G_Offs register and the q_fwa and q_mask fields of the G_Avail register.

4. Updates the G_Stats register.

5. Deposits 'entry' information at 'address'.

6. Uses an atomic operation to increment the requests field of the G_Reqs register.

To dequeue an entry, a consumer calls consume_entry which performs the following:

1. Uses an atomic operation to obtain the G_Avail register value.

2. Uses an atomic operation to obtain and update the G_Reqs register value.

The FCA is used to decrement the outstanding requests counter.

3. Uses an atomic operation to obtain and to update the G_Offs register value.

The FAA is used to increment the out_ord field.

4. Calculates the address in the wake queue from which to dequeue the entry using the out_ord and size fields of the G_Offs register and the q_fwa and q_mask fields of the G_Avail register.

5. Updates the G_Stats register.

6. Dequeues 'entry' information at 'address'.

7. Uses an atomic operation to increment the avail field of the G_Avail register.

This scheme allows coprocessors to communicate with faster processors without interrupting the faster processors. Some kernel routine must be embellished with the intelligence to handle each wake queue. In the described embodiment, this routine is the integrated dispatcher. When a fast processor executes whatever routine has been specified to handle the wake queue, it will dequeue entries and do whatever processing is appropriate for that entry.

The information communicated between the coprocessor and the processor is completely implementation independent as long as the coprocessor routine queuing entries and the kernel routine dequeuing entries mutually understand the contents of the entry and the processing appropriate for the entry.

Multiple wake queues can exist, and each different wake queue can have entirely unique entry formats. Each wake queue would depend upon setting up a set of global registers governing access to it and enhancing some kernel routine with the intelligence to process its entries. Each entry on a specific wake queue will be of the same format/size, but entries from different wake queues need have nothing in common. For example, one coprocessor may queue eight byte entries on a certain wake queue while another coprocessor may queue twenty-four byte entries on a different wake queue.

A command block is set up to detail specific processing. It is often associated with I/O. For example, the operating system can pass command blocks to a disk controller to inform the controller where data should be read from or written to, the amount of data to transfer, of other relevant parameters.

Command blocks can be queued on a wake queue to detail peripheral activity. That is, a fast processor could be the producer queuing an entry on a wake queue and the controller would then be a consumer dequeuing entries to decipher details of disk transfers. Note that this implies that a coprocessor routine rather than a kernel routine would be enhanced with the intelligence to process queue entries. Upon completion of the disk activity, the roles could be reversed. The controller would then be the producer queuing an entry on a different wake queue and the fast processor would then be a consumer dequeuing the entry to determine which process should be woken up as a result of the completed disk activity. (This is the example mentioned above of the coprocessor queuing an address on the wake queue and the integrated dispatcher waking up the process sleeping on that address.)

With respect to the queue entry function 80, a processor or coprocessor calls the queue_entry routine whenever it has information it wants communicated via the wake queue mechanism. Although not limited to this use, it was designed with the intent of allowing slower coprocessors to communicate with fast processors without interrupts.

For the consume entry function 30, whatever routine has been enhanced with the intelligence to process a wake queue's entries calls consume_entry to dequeue an entry and then performs the appropriate processing on that information. In the example described herein, the coprocessor queues an address on the wake queue which the integrated dispatcher dequeues. The integrated dispatcher knows that this address is the address of a semaphore upon which a process has been sleeping while waiting for the coprocessor to finish its task. The integrated dispatcher performs a wake operation on the semaphore, queuing the process on the run queue so that it can be chosen for execution.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. In a computing system having a plurality of shared data storage resources, a plurality of sources of service requests and a plurality of processors, each capable of performing tasks required by said service requests, apparatus for queuing service requests and processes for performing the required tasks comprising:
   wake queue means in at least one of said shared data storage resources for storing service requests,
   queue entry means coupled between the wake queue and the plurality of sources of service requests for entering in said wake queue means service requests and context used to respond to associated entered service requests,
   access means controlled by one of said plurality of processors for processing wake queue entries,
   consume entry means coupled to said wake queue means for retrieving a process identified by the said access means, and
   run queue' means coupled to said consume entry means for storing a retrieved process to be run when a processor becomes available to run the process identified by context entered in said wake queue means.

2. The apparatus of claim 1 wherein:
   said wake queue means includes a plurality of data storage areas within said plurality of shared data storage resources, and
   said queue entry means enters the context in said data storage areas in response to service requests.

3. The apparatus of claim 2 wherein at least one of said plurality of processors scans said wake queue for determining whether a service request requires handling.

4. The apparatus of claim 2 wherein said shared storage resources each comprise global register means shared by more than one of said plurality of processors and wherein said wake queue entry means sequentially enters said context in said global register means.

5. The apparatus of claim 4 wherein
   said queue entry means enter semaphore address entries in said global register means, and
   said consume entry means reads each semaphore address entry and retrieves a process waiting for each semaphore address.

6. The apparatus of claim 4 wherein
   said queue entry means enters command blocks in at least one of said global register means of said wake queue means, further including work queue means in at least one of said plurality of shared data storage resources for storing command blocks, and wherein said consume entry means includes
   means for reading a command block from said wake queue means,
   means for queuing a read out command block in said work queue means,
   means for retrieving a command block process to process the command block in said work queue means, and
   means for queuing said command block process in said run queue means.

* * * * *

UNITED STATES PATENT AND TRADEMARK OFFICE
CERTIFICATE OF CORRECTION

PATENT NO. : 5,202,988
DATED : April 13, 1993
INVENTOR(S) : George A. Spix et al.

It is certified that error appears in the above-indentified patent and that said Letters Patent is hereby corrected as shown below:

TITLE PAGE:

Under Assistant Examiner, please delete "Debra A. Chen" and insert --Debra A. Chun-- therefore.

Column 3, Line 39, insert --bells-- after service, therefore.

Column 3, Line 54, delete "waiting each" and insert --waiting for each-- therefore.

Signed and Sealed this

Eleventh Day of June, 1996

Attest:

BRUCE LEHMAN

Attesting Officer     Commissioner of Patents and Trademarks